United States Patent [19]

Kurosawa et al.

[11] Patent Number: 4,841,744
[45] Date of Patent: Jun. 27, 1989

[54] DOUBLE EFFECT AIR COOLED ABSORPTION REFRIGERATING MACHINE

[75] Inventors: Shigekichi Kurosawa; Yoshikazu Nagaoka, both of Tokyo; Shinichi Kannoh, Habikino; Sadatoshi Takemoto, Nagoya; Shigeo Sugimoto, Ushiku; Tomihisa Oouchi, Tsukuba; Toshio Hatada, Tsuchiura; Yoshifumi Kunugi, Ibaraki; Hironobu Kawamura, Ibaraki; Kyoji Kohno, Ibaraki; Kenzi Machizawa, Ibaraki, all of Japan

[73] Assignees: Hitachi, Ltd.; Osaka Gas Co., Ltd., both of Tokyo; Toho Gas Co., Ltd., Aichi, all of Japan

[21] Appl. No.: 145,316

[22] Filed: Jan. 19, 1988

[30] Foreign Application Priority Data

Jan. 19, 1987 [JP] Japan ............................ 62-8149
Feb. 17, 1987 [JP] Japan ............................ 62-32371
Feb. 17, 1987 [JP] Japan ............................ 62-32369

[51] Int. Cl.[4] ........................................ F25B 43/04
[52] U.S. Cl. ........................................ 62/475; 62/476
[58] Field of Search ........................... 62/475, 476

[56] References Cited

U.S. PATENT DOCUMENTS

| | | | |
|---|---|---|---|
| 2,722,806 | 11/1955 | Leonard, Jr. | 62/475 X |
| 2,760,350 | 8/1956 | Bourne | 62/475 X |
| 3,491,545 | 1/1970 | Leonard, Jr. | 62/476 X |
| 3,555,849 | 1/1971 | Bell, Jr. | 62/475 |
| 4,085,596 | 4/1978 | Miyamoto et al. | 62/476 |
| 4,748,830 | 6/1988 | Oouchi et al. | 62/476 |

Primary Examiner—Lloyd L. King
Attorney, Agent, or Firm—Antonelli, Terry & Wands

[57] ABSTRACT

A double effect air cooled absorption refrigerating machine consisting of fans provided on one side frame member out of the upper, lower and four side frame members which constitute a frame of a machine body, an air cooled heat exchanger provided on the remaining three side frame members and composed of an air cooled absorber and an air cooled condenser, and an evaporator, a high-temperature regenerator, a low-temperature regenerator, a solution heat exchanger and some other parts, all of which are provided on the inner side so as to be surrounded by the side frame members, the machine having a small installation area.

13 Claims, 8 Drawing Sheets

DOUBLE EFFECT AIR COOLED ABSORPTION REFRIGERATING MACHINE

BACKGROUND OF THE INVENTION

1. Field of the Invention

This invention relates to a double effect air cooled absorption refrigeration machine, and more particularly to a double effect air cooled absorption refrigerating machine capable of being constructed so as to have a suitably small installation area and a compact machine body.

2. Description of the Prior Art

The techniques, which are disclosed in, for example, Japanese Patent Laid-open No. 49970/1986, concerning an air cooled absorption refrigerating machine using water as a coolant and lithium bromide as an absorbent have been developed, and a refrigerating machine provided with fins on the outer surface of a vertical tube so as to cool an absorber and a condenser with an air current generated by fans has been practically used. In this air cooled refrigerating machine, the fans are arranged vertically in the upper portion thereof, and the air cooled heat exchangers at the left and right portions thereof.

However, in the air cooled absorption refrigerating machine, the air cooled heat transfer surface area and fan installation area increases, so that the machine installation area becomes very large.

In a refrigerating machine provided with fans at the upper portion thereof, the snow lies on the upper portion of the machine in winter in a cold district, and the snow causes the functions of the fans to be spoiled with the snow which enters the refrigerating machine and icicles which occurs thereon falling into the interior of the machine.

In an air cooled absorber using a vertical tube, an absorption liquid and coolant vapor are supplied to the upper portion of the vertical tube as disclosed in, for example, Japanese Patent Publication No. 3823/1978 and Japanese Patent Laid-open No. 6555/1986. However, no consideration is given to a non-condensible gas purging means and a cycle protecting means for the overcondensation of the absorption liquid.

The conventional refrigerating machines of this kind, for example, the refrigerating machines disclosed in Japanese Patent Publication Nos. 1543/1981 and 39740/1980 are provided with a separator, which is adapted to separate the surface active agent mixed in a refrigerant, in the intermediate portion of a passage through which the refrigerant is sent from a condenser to an evaporator, so as to return the surface active agent to an absorber.

SUMMARY OF THE INVENTION

Object of the Invention

An object of the present invention is to provide a double effect air cooled absorption refrigerating machine capable of increasing the air cooled heat transfer surface areas of an air-cooled absorber and an air cooled condenser, and the flow rate of the cooling air generated by the fans, minimizing the installation area and preventing the snow from entering the machine body in winter Another object of the present invention is to provide a double effect air cooled absorption refrigerating machine having an air cooled absorber and an air cooled condenser which are constructed so as to send the cooling air at right angles to the fincarrying vertical tubes, and capable of efficiently purging the non-condensible gas which exists in the machine, and preventing the overcondensation of a solution which would cause the crystallization thereof.

Still another object of the present invention is to provide a double effect air cooled absorption refrigerating machine, which has been developed with a view to solving the above-mentioned problems, and which is provided with a condenser and an absorber arranged so that the liquid levels therein are substantially equal, characterized in that this machine is capable of preventing a solution from flowing backward from the absorber to a surface active agent separator, the solution from being mixed in a refrigerant to cause the boiling point of the refrigerant to increase and the performance of the water heater to lower, and the solution from being overcondensed to cause the solution to be crystallized.

Statement of the Invention

The double effect air cooled absorption refrigerating machine according to the present invention consists of at least an evaporator, an air cooled absorber, an air cooled condenser, a high-temper regenerator, a low-temperature regenerator, a solution heat exchanger, pipes operatively connecting these parts, and fans for supplying cooling air to the air-cooled absorber and air cooled condenser, the machine being characterized in that these fans are provided on one side frame member out of the upper, lower, and four side frame members which constitute the frame of the machine body, an air cooled heat exchanger being provided on the remaining three side frame members, the main parts other than the air cooled heat exchanger, such as the evaporator, high-temperature regenerator, low-temperature regenerator, solution heat exchanger, and pipes operatively connecting these parts being provided so as to be surrounded by these side frame members, a cover being provided at the upper portion of the machine body.

Another mode of the embodiment of the double effect air cooled absorption refrigerating machine according to the present invention consists of an evaporator, an air cooled absorber, an air cooled condenser, a low-temperature regenerator, a high-temperature regenerator, a solution heat exchanger, a solution pump, a refrigerant pump, pipes operatively connecting these parts, and fans for supplying the cooling air to the air cooled absorber and air cooled condenser, the machine being characterized in that the air cooled absorber and air cooled condenser are composed of vertical tubes provided with fins on the outer surfaces thereof, the air cooled absorber having a plurality of path sections formed of a plurality of vertical tubes arranged in parallel with each other and the direction of a flow of the cooling air, with pump means provided, which are adapted to supply the thinnest absorption solution downward to the path section in which the temperature of the cooling air is the lowest, and gradually thicker solutions to the remaining parallel-arranged path sections in order, the air cooled condenser being provided on the side of the air cooled absorber in the path section in which the temperature of the air is the lowest, a flow passage being provided above the vertical tubes to supply refrigerant vapor to the air cooled absorber and air cooled condenser, lower headers in the air cooled absorber for collecting a weak solution in each of the plural path sections and lower headers in the air cooled condenser for collecting a liquefied refrigerant in each path section being provided in a row at the lower portions of the vertical tubes, a bleeder pipe being connected to said lower headers, an overflow pipe for a liquid refrigerant, which connects the evaporator and the lower headers in the air cooled absorber via a liquid seal means, being further provided.

Still another mode of the embodiment of the double effect air cooled absorption refrigerating machine according to the present invention consists of a regenerator, a condenser, an evaporator, an absorber, a solution heat exchanger, a solution pump, a refrigerant pump, pipes operatively connecting these parts, and a separator which is provided in the intermediate portion of the pipe connecting the condenser and evaporator together, and which is adapted to separate a surface active agent, the machine being characterized in that a layer of the surface active agent separated in the separator and the absorber is connected via a backward flow preventing means.

DESCRIPTION OF THE PREFERRED EMBODIMENTS

Figure 1:
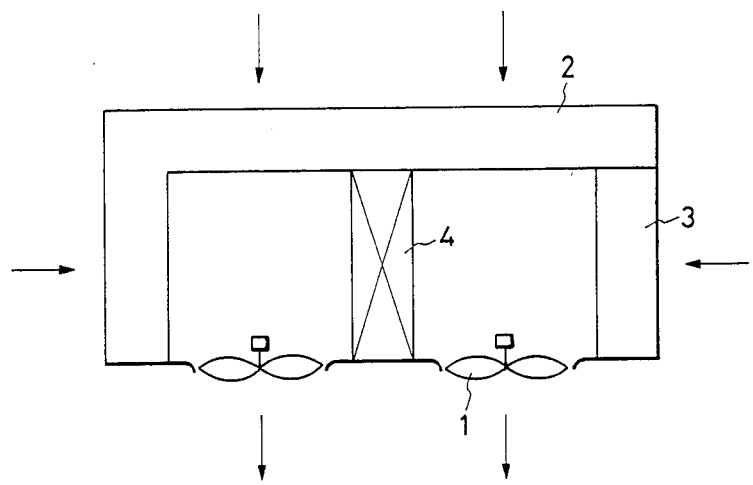
FIG. 1 is a plan view schematically showing the construction of an embodiment of the double effect air cooled absorption refrigerating machine according to the present invention.
Figure 2:
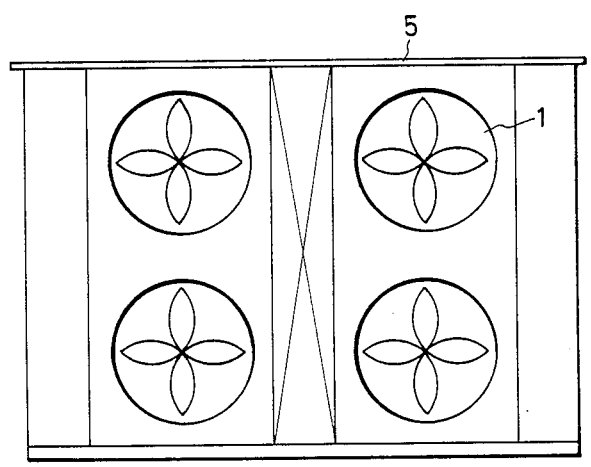
FIG. 2 is a front elevation of the embodiment of FIG. 1.

FIG. 1 is a plan view schematically showing the construction of an embodiment of the double effect air cooled absorption refrigerating machine according to the present invention, and FIG. 2 a front elevation of the embodiment.

Reference numeral 1 denotes a plurality (four in the illustrated embodiment) of fans provided on one side frame member out of the upper, lower and four side frame members which constitute a machine frame, 2 an air cooled absorber provided on two side frame members, and 3 an air cooled condenser provided on the remaining side frame member. Thus, the three side frame members except the side frame member on which the fans are provided form an air cooled heat exchanger consisting of the air cooled absorber and air cooled condenser. Reference numeral 4 denotes the other parts provided in the central portion of the machine body, which parts include the main parts of the machine, such as an evaporator, a high-temperature regenerator, a low-temperature regenerator, a solution heat exchanger, a refrigerant pump, a solution pump and pipes, all of which are arranged in a concentrated manner in the mentioned place.

The arrows shown in the drawing denote the flows of the air occurring due to the rotation of the fans 1, and the machine is ventilated well and can be cooled with the air flowing at a high rate.

Reference numeral 5 denotes a cover provided at the upper portion of the machine body, which cover 5 constitutes an inclined roof capable of preventing the snow from lying thereon in winter. If the cover 5 constituting the inclined roof is provided with suitable eaves, the icicles occurring thereon do not contact the air cooled absorber 2 and air cooled condenser 3, nor do they fall into the interior of the machine body.

A double effect air cooled absorption refrigerating machine generally requires to have a large air cooling heat transfer surface area. According to this embodiment, the space factor becomes highest, and the machine body can be extended in the direction of the height thereof when the capacity of the machine is in a certain level. This enables the installation area to be minimized, and the radiation rate to be increased.

Another embodiment of the present invention will now be described with reference to FIGS. 3 and 4.

Figure 3:
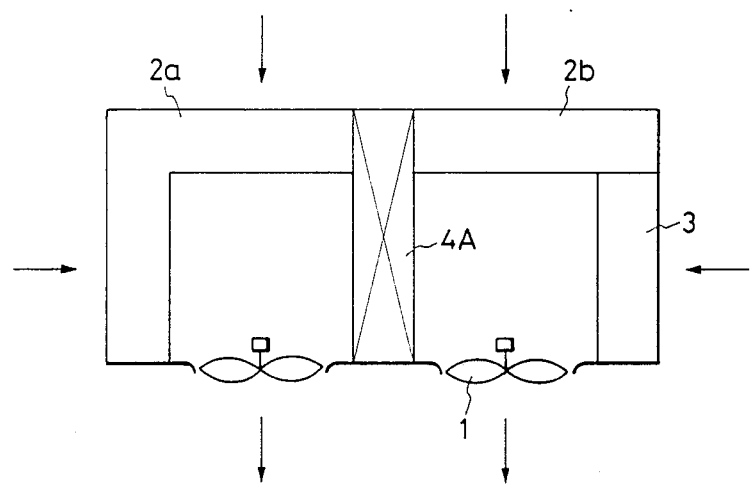
FIG. 3 is a plan view schematically showing the construction of another embodiment of the double effect air cooled absorption refrigerating machine according to the present invention.
Figure 4:
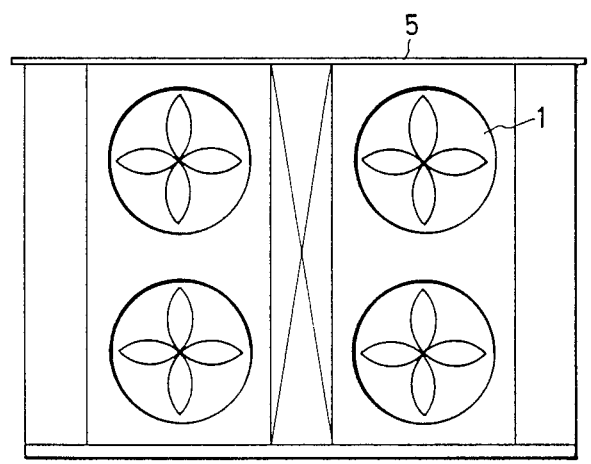
FIG. 4 is a front elevation of the embodiment of FIG. 3.

FIG. 3 is a plan view schematically showing the construction of this embodiment of the double effect air cooled absorption refrigerating machine according to the present invention, and FIG. 4 is a front elevation of the same embodiment. Referring to these drawings, the same reference numerals as in FIG. 1 denote equivalent parts, the descriptions of which are omitted.

The embodiment of FIG. 3 differs from the embodiment of FIG. 1 in that an air cooled absorber 2 is divided into left and right portions 2a, 2b, and the other parts 4 provided in the central portion of the machine body are partly inserted in a boundary portion between these left and right portions 2a, 2b.

According to the embodiment of FIG. 3, the same effect as in the embodiment of FIG. 1 can be obtained, and the maintenance of the parts provided in the central portion of the machine body can be carried out easily.

The concrete construction of each part of this embodiment will now be described with reference to FIGS. 5-8. First, FIG. 5 is a cycle system diagram.

Figure 5:
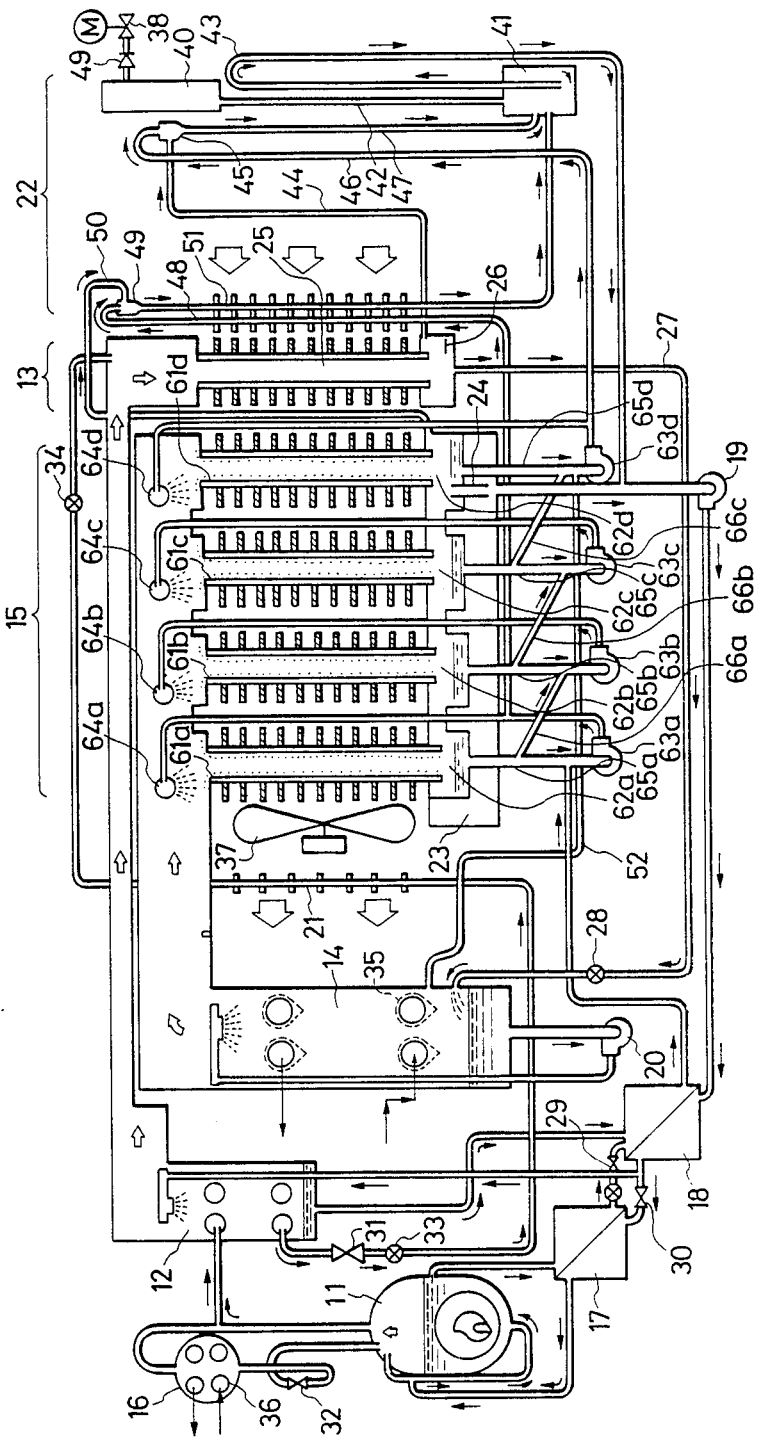
FIG. 5 is a cycle system diagram of one of the embodiments of the double effect air cooled absorption refrigerating machine, which are shown in FIGS. 1-4.

The double effect air cooled absorption refrigerating machine shown in FIG. 5 consists of a high-temperature regenerator 11, a low-temperature regenerator 12, an air cooled condenser 13, an evaporator 14, an air cooled absorber 15, a hot water heat exchanger 16, a high-temperature heat exchanger 17, a low-temperature heat exchanger 18, a solution pump 19, a refrigerant pump 20, a precooler 21, an automatic bleeder 22, pipes connecting these parts together operatively, and a fan 37 for supplying the cooling air to the air cooled condenser 13 and air cooled absorber 15 in the direction of a white arrow.

The air cooled absorber 15 consists of a plurality (four in the illustrated embodiment) of vertical tube having horizontally extending fins on the outer surfaces thereof, which vertical tubes are arranged in parallel with one another in the direction of the flow of the cooling air to form a plurality of path sections. Namely, the air cooled absorber 15 is provided with a plurality of path sections consisting of a fourth path vertical tube 61d, a third path vertical tube 61c, a second path vertical tube 61b and a first path vertical tube 61a. These vertical tubes 61 (which is a general reference numeral for the vertical tubes 61a–61d) are provided with a first path lower header 62a, a second path lower header 62b, a third path lower header 62c and a fourth path lower header 62d. A first spray pump 63a, a second spray pump 63b, a third spray pump 63c and a fourth spray pump 63d are connected to these lower headers 62 (which is a general reference numeral for the lower headers 62a–62d), and a first sprayer 64a, a second sprayer 64b, a third sprayer 64c and a fourth sprayer 64c, which are used to distribute an absorption liquid, are provided above the vertical tubes 61a, 61b, 61c and 61d. The fourth path lower header 62d and a weak solution tank 23 provided under the lower heads 62 are communicated with each other via a gas and liquid mixture flow-down pipe 24, and a suction port of the solution pump 19 is provided in opposition to the lower end of the pipe 24. Owing to the gas-liquid mixing effect obtained when the solution flows down, the non-condensible gas in the vicinity of the fourth lower header 62d is extracted and discharged to the high-temperature regenerator 11 and low-temperature regenerator 12 which are little influenced by the non-condensible gas. The solution flows through the path sections in the absorber 15 through connection pipes 66a, 66b, 66c provided among the suction pipes 65a–65d, and the density of the absorption liquid, which absorbs the refrigerant vapor in the first to fourth path sections in order, gradually decreases.

The air cooled condenser 13 consists of a vertical tube 25 having fins on the outer surface thereof. The upper end portion of this vertical tube 25 is communicated with the low-temperature regenerator 12, and the lower end portion thereof with the evaporator 14 via a lower header 26, a liquid refrigerant pipe 27 and a throttle 28. The results of the discussion of the designing of the present invention show that, if the air cooled condenser 13 is provided in the position in which the condenser 13 is close to the fourth path section of the air cooled absorber 15 and opposed to the cooling air inlet rather than the third path section, the parts can be arranged most compactly. If the air cooled condenser 13 is thus provided, the condenser 13 and the fourth path section of the air cooled absorber 15 can be heat-exchanged with the lowest-temperature cooling air.

First, a room-cooling operation included in the cyclic operations of such a double effect air cooled absorption refrigerating machine will now be described.

Absorption liquid of lithium bromide heated with a combustion gas, such as a town gas in the high-temperature regenerator 11 generates refrigerant (water) vapor, and is thereby condensed, the resultant absorption liquid reaching the suction portion of the first path spray pump 63a in the absorber 15 via the high-temperature heat exchanger 17, a cooling-warming change-over valve 29 and the low-temperature heat exchanger 18. On the other hand, in the low-temperature regenerator 12, the refrigerant vapor generated in the high temperature regenerator 11 is introduced into the pipes joined thereto, and the absorption liquid is sprayed to the outer side of the pipe. The absorption liquid is subjected to heat exchange, and generates refrigerant vapor. The absorption liquid is thus condensed, and returns to the absorber 15 via the low-temperature heat exchanger 18 in which the absorption liquid is mixed with the dense solution from the high-temperature regenerator 11.

The refrigerant vapor in a heat transfer pipe in the low-temperature regenerator 12 is condensed and liquefied, and the resultant liquid is subjected to heat exchange with the cooling air in a cooling-warming change-over valve 31, a throttle 33 and a precooler 21 and thereby cooled, the liquid being then introduced into the air cooled condenser 13 via a throttle 34. The refrigerant vapor occurring in the low-temperature regenerator 12 is introduced into the air cooled condenser 13, cooled with the cooling air, and thereby condensed and liquefied, and the liquid thus produced flows down to the lower header 26. This liquid refrigerant is sent to the evaporator 14 via the refrigerant pipe 27 and throttle 28, and sprayed over the heat transfer pipes 35 in the evaporator 14 by the refrigerant pump 20. The resultant liquid refrigerant is subject to heat exchange with the cold water flowing in the heat transfer pipes 35, and it is thereby evaporated and gasified. During this time, the latent heat of evaporation is taken from the cold water in the heat transfer pipes 35 to display the refrigerating effect.

The refrigerant vapor occurring in the evaporator 14 is introduced to the absorber 15, and flows from the upper portions of the vertical tubes 61a–61d thereinto to be absorbed by the absorption liquid. The dense liquid from the high-temperature regenerator 11 and low-temperature regenerator 12 enters the first path vertical tube 61a first and absorbs the refrigerant vapor, and the density of the solution gradually decreases. Accordingly, the saturation temperature T1 of the absorption liquid with respect to the refrigerant vapor also decreases. As a result, the solution enters the fourth path vertical tube 61d with the temperature and density thereof in the lowest levels. On the other hand, the temperature of the cooling air increases gradually due to the heat exchange from the fourth path section to the first path section. Such heat exchange can be regarded as four-path orthogonal counter-flow heat exchange, and it enables the saturation temperature of the absorption liquid in the first path section to be set low as compared with the temperature of the cooling air coming out of the fourth path section substantially in the same manner as in a water cooled cold calorifier. This enables an air cooled absorption refrigerating cycle, which has been said to be impossible to materialize, to be obtained.

The low-temperature, low-density absorption liquid produced in the absorber 15 is divided into two by the solution pump 19 through the low-temperature heat exchanger 18. One divisional absorption liquid is sent to the low-temperature regenerator 12, and the other to the high-temperature regenerator 11 via the high-temperature heat exchanger 17, to complete a refrigerating cycle.

A room-warming cycle will now be described. When the air-conditioning change-over valves 29, 30 provided at the solution outlet-inlet port of the high-temperature regenerator 11 and an air-conditioning change-over valve 31 provided at the intermediate portion of a refrigerant flow passage extending from the high-temperature regenerator 11 to the condenser 13 through the interior of the heat transfer pipe in the low-temperature regenerator 12 and precooler 21 are closed with a condensed water discharge valve 32 in the hot water heat exchanger 16 which is connected to the high-temperature regenerator 11 opened, the liquid refrigerant in the hot water heat exchanger 16 is discharged into the high-temperature regenerator 11 to enable the refrigerant vapor occurring in the high-temperature regenerator 11 to flow into the hot water heat exchanger 16. Accordingly, the hot water flowing in the heat transfer pipe 32 in the hot water heat exchanger 16 can be heated. During this time, the density of the solution in the high-temperature regenerator 11 decreases due to the liquid refrigerant supplied thereto, and, even when the hot water of a high temperature (60° C.) is taken out, the boiling point can be kept lower than that in a room cooling operation. This enables the boiler efficiency to be improved.

The construction and operation of the automatic bleeder 22 will now be described. The automatic bleeder 22 is a bleeder utilizing the gas-carrying effect due to the movement of a liquid and provided with a gas storage tank 40 connected to a gas discharge means (not shown) via an electromagnetic valve 38 and a check valve 39, a gas-liquid separator 41 provided below the tank 40, a gas ascension pipe 42 connecting the gas storage tank 40 and gas-liquid separator 41 together, and an inverted U-shaped seal pipe 43 extending from the bottom portion of the separator 41, the absorption liquid returning to the suction pipe for the solution pump 19 via the inverted U-shaped seal pipe 43. A bleeder pipe 44 connected to the lower header 26 of the air cooled condenser 13 is joined to a gas mixing chamber 45. With the absorption of the refrigerant vapor into a weak solution flowing down through a weak solution pipe 46, the air cooled condenser 13 is subjected to bleeding, and the extracted non-condensible gas flows down in a gas-liquid mixed state in a gas-liquid flow down pipe 47 to be sent to the gas-liquid separator 41, in which the gas is separated. The separated gas flows up to the gas storage tank 40, and the weak solution is returned to the suction port of the solution pump 19 via the inverted U-shaped seal portion 43. Owing to the pressure maintaining effect of the inverted U-shaped seal pipe and the reverse air lift pumping effect of the gas-liquid flow down pipe 47, a gas can be stored in the gas storage tank 40 at a pressure higher than the internal pressures of the air cooled absorber 15 and air cooled condenser 13. Therefore, an aspirator or a low-vacuum discharge pump serve sufficiently as the above-mentioned air discharge means.

In this embodiment, two bleeders are used for the bleeding of the air cooled absorber 15. A first bleeding means consists of the gas-liquid flow down pipe 24, by which a gas is simply discharged to the high-pressure side, and it has a large effect in preventing the overcondensation of an absorption liquid. A second bleeding means consists of the reverse air lift pump mentioned above. A comparatively dense solution is introduced from the first spray pump 63a to the gas mixing chamber 49, which is provided in a position higher (suitably by about 250 mm) than the gas mixing chamber 45 for the extracted gas from the condenser 13, through the precooler 48 provided with fins on the outer surface thereof, and absorbs the refrigerant vapor introduced from a bleeder pipe 50 connected to the fourth path lower header 62d in the air cooled absorber 15, the non-condensible gas carried by this refrigerant vapor being subjected to mixing in a gas-liquid flow down pipe 51 and sent to the separator 41. The gas-liquid flow down pipe 51 is also provided with fins and cooled with the cooling air. Since these pre-cooler 48 and gas-liquid flow down pipe 51 are cooled with the air on the side of the cooling air inlet, the saturation vapor pressure of the solution is lower than the pressure in the lower 62 in the air cooled absorber 13.

When the liquid refrigerant is overcondensed and stagnates in excessive quantities in the evaporator 14, it flows into the suction pipe joined to the fourth spray pump 63d via an overflow pipe 52, and the fourth path circulated solution is diluted. The density of the weak solution sent from the solution pump 19 decreases rapidly without accompanying a rapid decrease in the temperature thereof, so that the crystallization of the dense solution in the low-temperature heat exchanger 18 can be prevented.

Since the liquid is sealed in the pipe to form a liquid-sealed state, in which the flow of vapor is stopped by the liquid, i.e., since a so-called liquid seal is formed, the entry of vapor does not occur, and, therefore, the bleeding of the lower header 62 is not hampered Accordingly, even when the overcondensation occurs due to the existence of, especially, a non-condensible gas, the self-returning capability can be displayed.

According to this embodiment, the supplying of refrigerant vapor to the air cooled absorber and air cooled condenser which are formed so that the cooling air flows at right angles to the vertical tubes therein having fins on the outer surfaces thereof is done only from the upper portions of the vertical tubes, the liquid refrigerant overflow pipe extending from the evaporator is connected to the air cooled absorber via a liquid seal. Consequently, the non-condensible gas in the machine body always stagnates in a condensed state in the lower portions of the vertical tubes, and the bleeding from the lower headers can be done efficiently. Therefore, the overcondensation of the absorption liquid, which causes the crystallization thereof, can be prevented.

Still another embodiment of the present invention will now be described with reference to FIG. 6.

Figure 6:
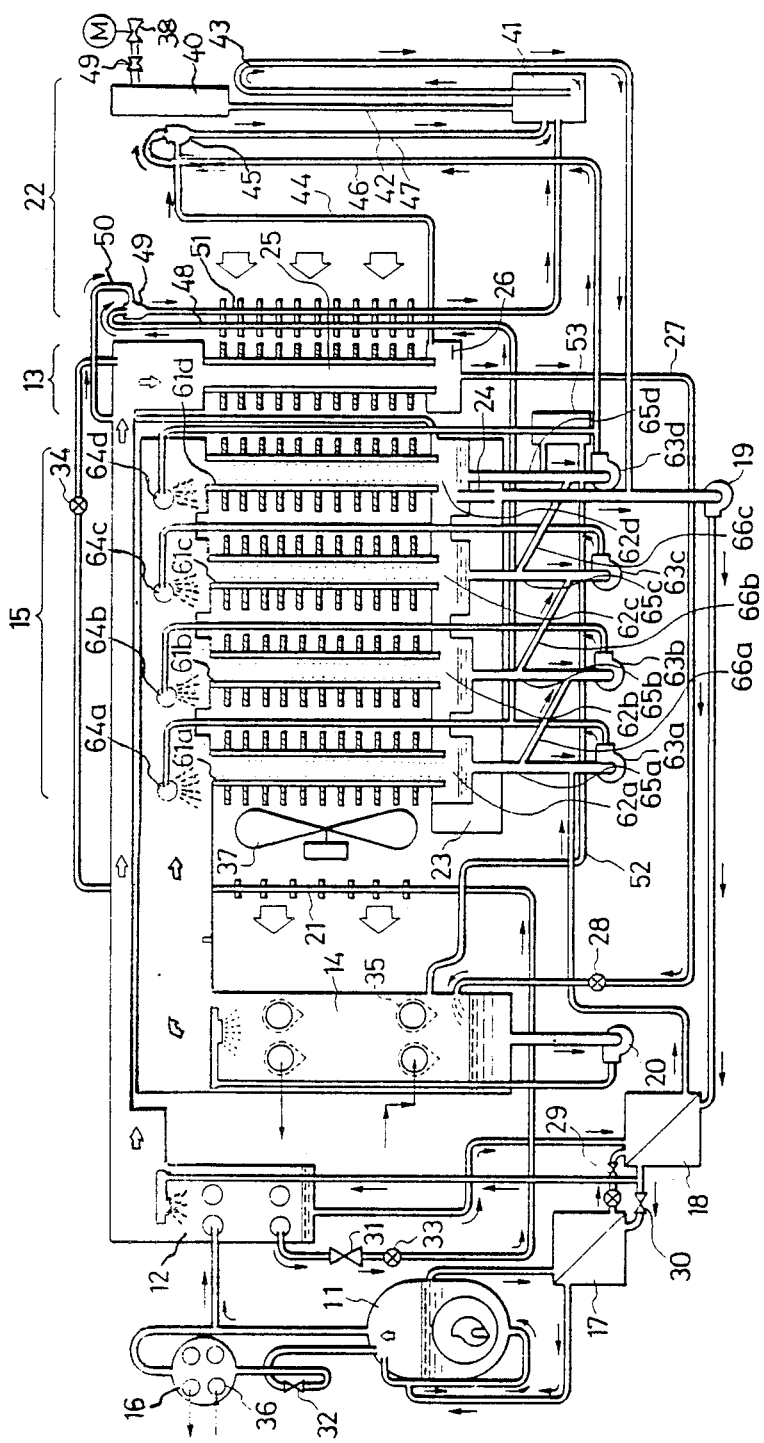
FIG. 6 is a cycle system diagram of the other of the embodiments of the double effect air cooled absorption refrigerating machine, which are shown in FIGS. 1-4.

FIG. 6 is a cycle system diagram of this embodiment of the double effect air cooled absorption refrigerating machine according to the present invention. Referring to this drawing, the reference numerals identical with those in FIG. 5 represent parts identical with those of the embodiment of FIG. 5, and the descriptions of these parts are omitted.

The embodiment of FIG. 6 differs from that of FIG. 5 in that the former is provided with a liquid refrigerant heat exchanger 53. The liquid refrigerant heat exchanger 53 is provided so as to subject to heat exchange a sprayed solution flow passage, which is joined to a fourth sprayer 64d adapted to spray a solution over a fourth path vertical tube 61d in the final path section of an air cooled absorber 15, and a liquid refrigerant overflow pipe 52.

If this embodiment is thus constructed, the same effect as in the previously-described embodiment can be obtained. Moreover, the absorption capacity of the final path increases, and the non-condensible gas in the machine body gathers in the final path owing to the movement of the vapor. Consequently, the density of the non-condensible gas increases, so that the bleeding can be done easily. This constitutes the unique effect of this embodiment.

A further embodiment will now be described with reference to FIG. 7.

Figure 7:
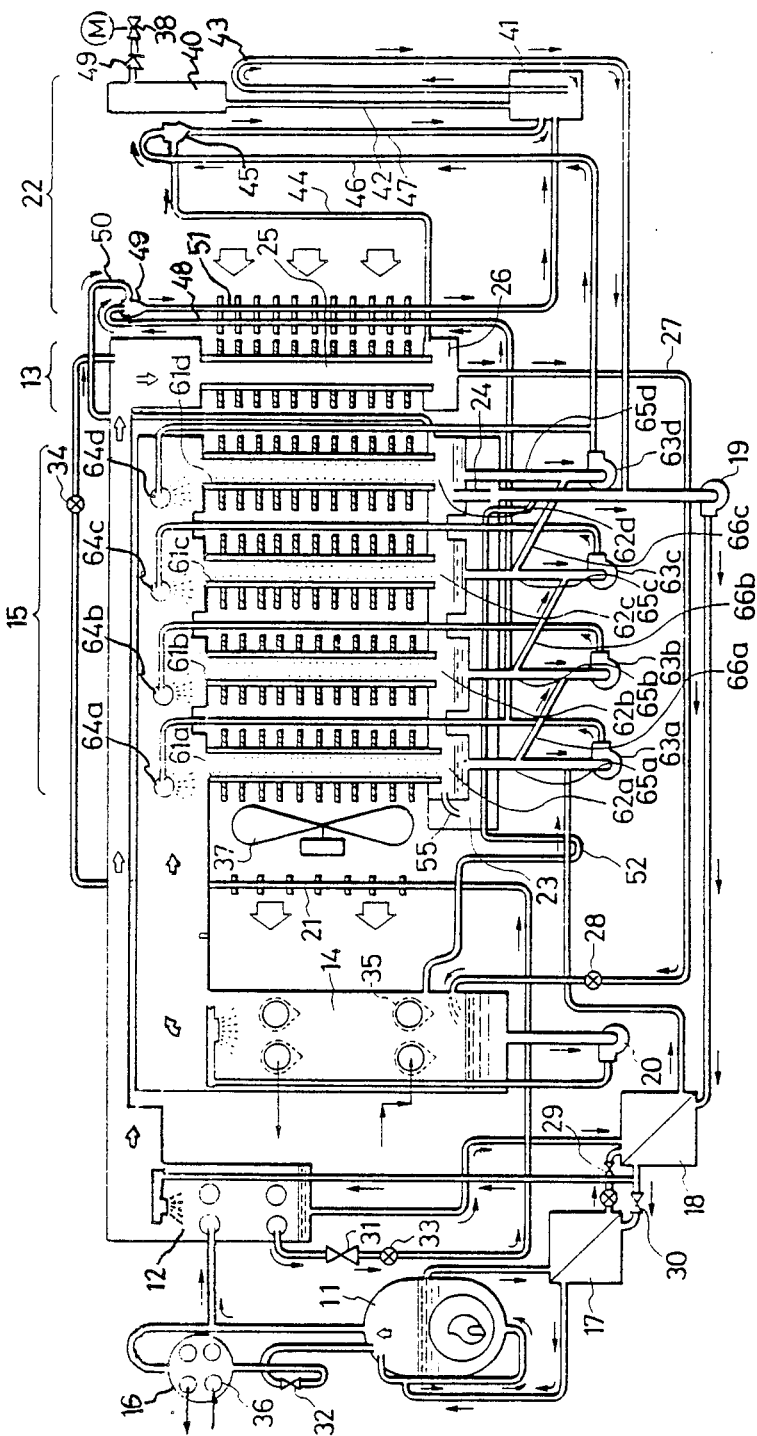
FIG. 7 is a cycle system diagram of still another embodiment of such double effect air cooled absorption refrigerating machines as are shown in FIGS. 1-4.

FIG. 7 is a cycle system diagram. Referring to FIG. 7, the reference numerals identical with those in FIG. 5 represent parts identical with those of the embodiment of the embodiment of FIG. 5, and the description of these parts are omitted.

The embodiment of FIG. 7 differs from that of FIG. 5 in the arrangement and construction of the overflow pipe.

As shown in FIG. 7, an overflow pipe 54 is connected at its one end to an evaporator 14, forms a U-shaped seal portion constituting a liquid seal means, and is then connected at the other end thereof to the suction port of a solution pump 19 through the interior of a weak solution tank 23. Reference numeral 55 denotes a connection pipe by which a lower header 62 and the weak solution tank 23 are communicated with each other in a gaseous phase portion.

According to the embodiment of FIG. 7, the same effect as that of the embodiment of FIG. 5 can be obtained. The liquid refrigerant in the overflow pipe 54 is subjected to heat exchange with the solution in the weak solution tank 23 and thereby cooled. Consequently, the non-condensible gas in an air cooled heat exchanger unit (an air cooled condenser 13 and an air cooled absorber 15) moves into the weak solution tank 23. This produces the following effects.

(1) The bleeding of the weak solution tank 23 can be done effectively.
(2) Since the non-condensible gas in the air cooled heat exchanger unit moves into the weak solution tank 23, the heat transfer performance improves.

A further embodiment will now be described with reference to FIG. 8. Referring to the drawing, the reference numerals identical with those in FIG. 5 represent parts identical with those of the embodiment of FIG. 5, and, therefore, the descriptions thereof are omitted.

Figure 8:
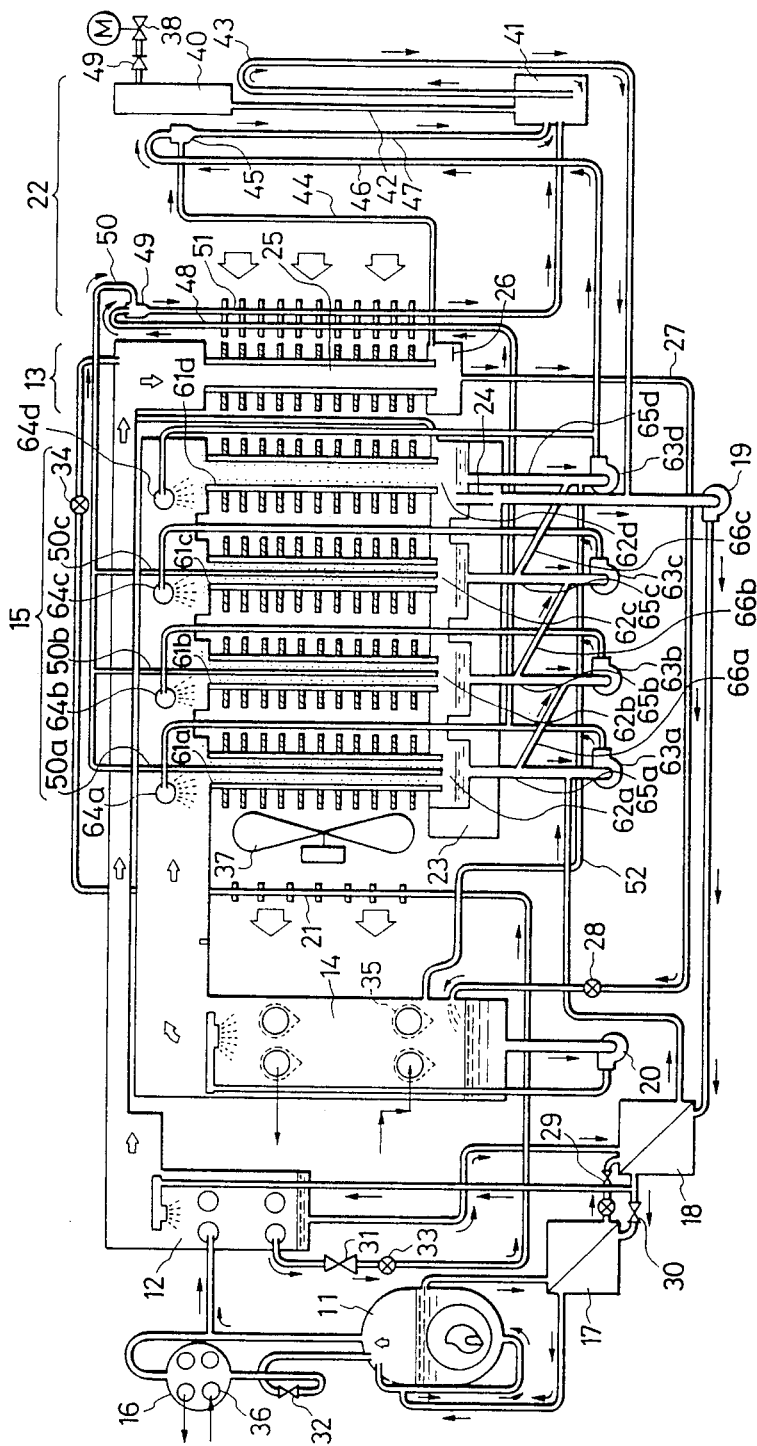
FIG. 8 is a cycle system diagram of a further embodiment of such double effect air cooled absorption refrigerating machines as are shown in FIGS. 1-4.

In the embodiment of FIG. 8, a lower header 26 of an air cooled condenser 13, and the lower headers provided in row at the lower portions of the vertical tubes constituting the path sections in an air cooled absorber 15, i.e. a first path lower header 62a, a second path lower header 62b, a third path lower header 62c and a fourth path lower header 62d are formed independently of one another. A bleeder pipe 50 is provided so as to branch into each path section. Namely, a branch bleeder pipe 50a is inserted into the first path vertical tube 61a, a branch bleeder pipe 50b into the second path vertical tube 61b, and a branch bleeder pipe 50c into the third path vertical tube 61c.

According to the embodiment of FIG. 8, the same effect as that of the embodiment of FIG. 5 can be obtained. Moreover, since the bleeder pipes are inserted into the respective path sections, the extraction of the non-condensible gas can be carried out efficiently.

If a branch bleeder pipe (not shown) is provided in a weak solution tank 23 in parallel with the above-mentioned branch bleeder pipes so as to discharge the non-condensible gas entering the same tank, the bleeding of the non-condensible gas can be done more effectively.

Figure 9:
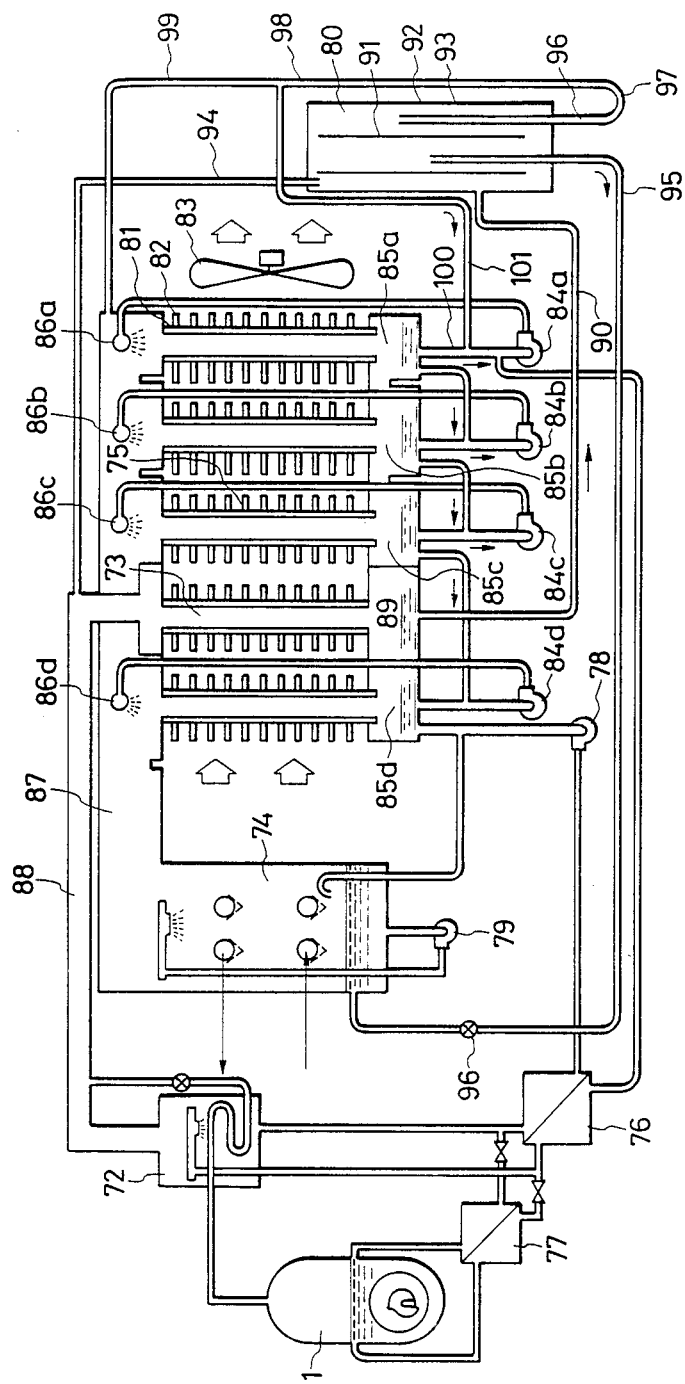
FIG. 9 is a cycle system diagram of a further embodiment of the double effect air cooled absorption refrigerating machine.

A further embodiment of the present invention will now be described with reference to FIG. 9.

The double effect air cooled absorption refrigerating machine shown in FIG. 9 consists of a high-temperature regenerator 71, a low-temperature regenerator 72, an air cooled condenser (which will hereinafter be referred to simply as condenser) 73, an evaporator 74, an air cooled absorber (which will hereinafter be referred to simply as absorber) 75, a low-temperature heat exchanger 76, a high temperature heat exchanger 77, a solution circulating pump (which will hereinafter be referred to simply as solution pump) 78, a refrigerant spray pump (which will hereinafter be referred to simply as refrigerant pump) 79, a surface active agent separator (which will hereinafter be referred to simply as separator) 80, pipes operatively connecting these parts together, and a cooling fan 83 for supplying the cooling air to the condenser 73 and absorber 75 in the direction of white arrows.

Each of the absorber 75 and condenser 73 consists of a plurality of vertical tubes 81 each of which has a plurality of spiral grooves (now shown) in the inner surface thereof, and a plurality of horizontal fins 82 on the outer surface thereof.

The absorber 75 has a plurality of a plurality of vertical tubular flow passages (which will hereinafter be referred to as paths) consisting of a plurality (four in the embodiment of FIG. 9) of vertical tubes 81 of the above-mentioned construction which are arranged in parallel in the direction of a flow of the cooling air.

The absorber 75 has four spray pumps 84 (which is a general reference numeral of the pumps 84a-84d). The first spray pump 84a for the first path, the second spray pump 84b for the second path, the third spray pump 84c for the third path and the fourth spray pump 84d for the fourth path are communicated with lower headers 85 (which is a general reference numeral of the headers 85a-85d). The lower headers 85 consist of partitioned lower headers including a lower header 85a of the first path, a lower header 85b of the second path, a lower header 85c of the third path and a lower header 85d of the fourth path. The vertical tubes constituting the four paths are provided thereabove with sprayers 86a, 86b, 86c, 86d, and the upper portions of the paths are joined to a refrigerant vapor supply duct 87 extending from the evaporator 74.

Since the condenser 73 is provided between the fourth path and third path in the absorber 75, the temperature utilization efficiency of the cooling air is high. The upper portion of the condenser 73 is connected to a refrigerant vapor supply duct 88 extending from the low-temperature regenerator 72, and a lower header 89 of the condenser 73 to the intermediate portion of the separator 80 via a connection pipe 90.

The interior of the separator 80 is separated into a surface active agent layer 92 and a liquid refrigerant layer 92 via a partition 91 constituting a submerged dam, and these two layers are communicated with each other at the upper gaseous phase portion and lower liquid phase portion. The upper gaseous phase portion and condenser 73 are communicated with each other via an equalizing pipe 94, and a liquid refrigerant introducing pipe 95, which is opened in the liquid surface of the liquid refrigerant layer 93, forms a U-shaped seal extending to the evaporator 74, the pipe 95 being communicated with the evaporator 74 via a throttle 96 (or a pressure reducing means, such as a thin tube) provided in a portion of the pipe 95 which is in the vicinity of the opening of the evaporator 74. The liquid refrigerant is sent to the evaporator 74 via this liquid refrigerant introducing pipe 95.

A surface active agent introducing pipe 96 opened in the surface active agent layer 92 extends to a position, which is higher than the lower header 85 of the absorber 75, via a U-shaped seal portion 97 to form a rising portion 98 and then branches in two directions, one branch portion being connected to the upper portion of the absorber 75 via an equalizing pipe 99, the other branch portion being connected to a suction pipe 100 of the first spray pump 84a via a pipe 101.

A mixed liquid of a surface active agent and liquid refrigerant is introduced from the condenser 73 into the separator 80 via the pipe 90, and the surface active agent having a lower density is separated into the upper surface active agent layer 92 with the liquid refrigerant, which has a higher density, introduced into the liquid refrigerant layer 93 via the communication portion below the partition 91. The heights of the positions, which are in the separator 80, of the openings of the liquid refrigerant introducing pipe 95 and surface active agent introducing pipe 96 are different, i.e., the opening of the surface active agent introducing pipe 96 is higher, so that, unless the surface active agent stagnates in the separator 80, nothing flows out from the pipe 96. Accordingly, the liquid refrigerant is not discharged from the pipe 96.

A liquid head $\Delta H_1$ in the surface active agent introducing pipe 96 and U-shaped seal portion 97, a liquid head $\Delta H_2$ in the rising portion 98 and a liquid head $\Delta H_3$ occurring in the equalizing pipe 99 have the following relation.

$$\Delta PcA = (\Delta H_2 + \Delta H_3 - \Delta H_1) \cdot \zeta \quad (1)$$

wherein $\Delta PcA$ is a difference between the pressures in the condenser 73 and absorber 75; and $\zeta$ the concentration of the surface active agent.

A solution head $\Delta H_4$ in the first path lower header 85a in the absorber 75 and pipe 101 and a liquid head $\Delta H_5$ of surface active agent in the pipe 101 have the following relation.

$$\Delta H_4 \cdot \zeta 1 \leq (\Delta H_5 + \Delta H_3) \cdot \zeta (2)$$

The surface active agent flows into a suction pipe 100 of the first spray pump 84a.

While the operation of the machine is interrupted, the solution is diluted, and the portion of the solution which has been lifted above the liquid level in the lower headers 85 in the absorber 75 flows down, so that the liquid level therein becomes higher. During this time, the solution flows back into the pipe 101, and the surface active agent as well into the surface active agent layer 92. However, since the rising portion 98 extends to a position sufficiently higher than the liquid level in the lower header 85, the solution in the pipe 101 flows up only to the height at which the solution is balanced. This prevents the solution from flowing into the rising portion 98.

Since this embodiment is constructed as mentioned above, the absorber 75 and condenser 73 can be formed compactly so as to have the lower headers 85, 89 in the same level, and, moreover, the backward flow of the solution into the surface active agent separator can be prevented.

According to this embodiment, a means for preventing the backward flow of the solution is provided between the surface active agent separator 80 and absorber 75, and, therefore, the solution in the absorber does not flow into the separator 80 even when the liquid level in the absorber and the difference between the pressures in the condenser 73 and absorber 75 vary. Since the solution is not mixed in the liquid refrigerant, an increase in the boiling point of the refrigerant, which causes the performance of the machine to lower, and the overcondensation of the solution, which causes the solution to be crystallized, can be prevented, and a room cooling operation can be carried out safely and reliably.

Since this embodiment is provided with a backward flow preventing means without using a valve, such as a check valve or an electromagnetic valve in, especially, the pipe 101, it has a high reliability.

A further embodiment of the present invention will now be described with reference to FIG. 10.

Figure 10:
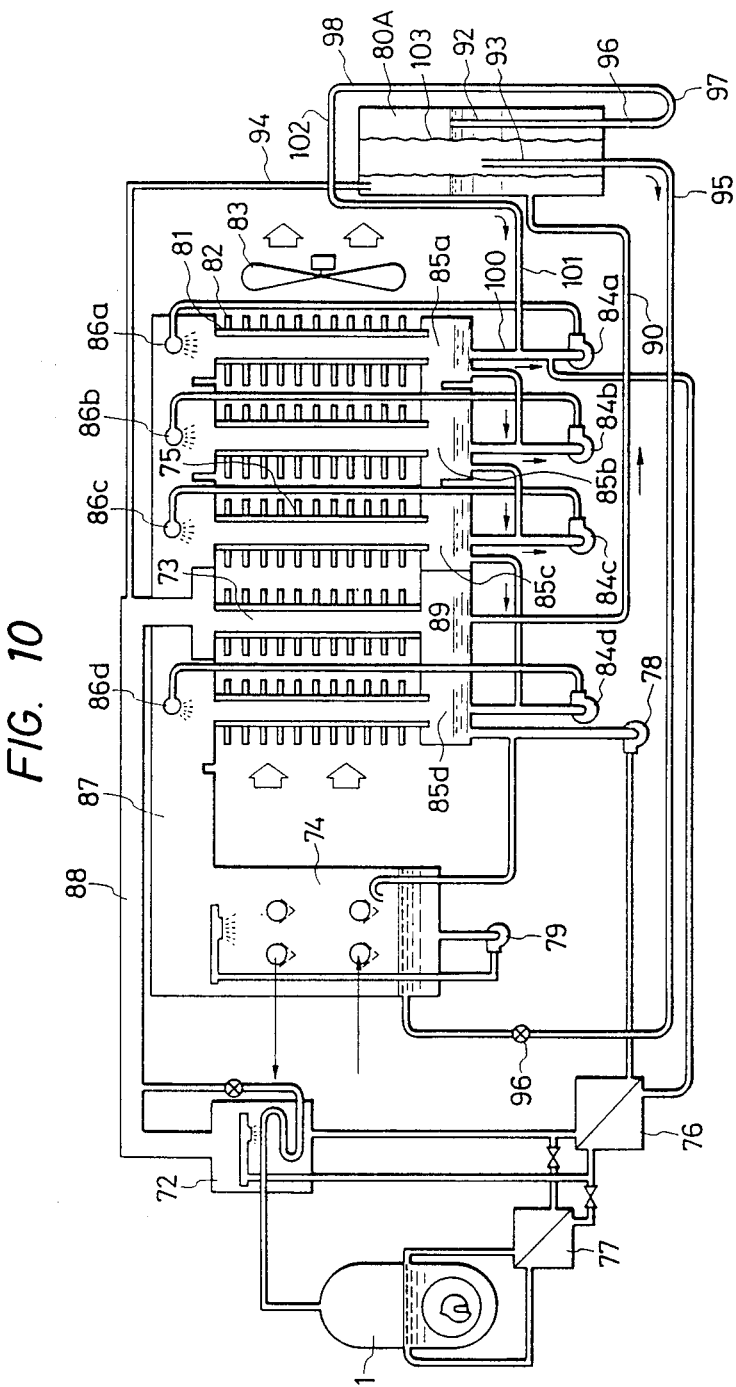
FIG. 10 is a cycle system diagram of a further embodiment of the double effect air cooled absorption refrigerating machine.

FIG. 10 is a cycle system diagram of this embodiment of the double effect air cooled absorption refrigerating machine. Referring to the drawing, the reference numerals identical with those in FIG. 9 represent parts identical with those of the embodiment of FIG. 9, and, therefore, the descriptions of such parts are omitted.

The embodiment of FIG. 10 is different from the embodiment of FIG. 9 in the following two points.

(1) A semipermeable membrane 103 is employed instead of the partition 91.

(2) An inverted U-shaped seal 102 is provided, with the equalizing pipe 99 removed.

The semipermeable membrane 103 is adapted to permeate therethrough a refrigerant (for example, water), and not to a surface active agent having large molecular weight (for example, n-octyl alcohol and 2-ethyl hexyl alcohol), and it is capable of miniaturizing a separator 80A efficiently.

The inverted U-shaped seal 102 becomes capable of preventing a backward flow of the solution if a thin layer of refrigerant vapor is formed therein.

If the non-condensible gas should flow into this inverted U-shaped seal 102 in the embodiment of FIG. 10, an operational trouble occurs in some cases but, owing to the elimination of the equalizing pipe 99, the manufacturing cost can be reduced.

In another embodiment (not shown) of the present invention, the pipes 96, 101 may be connected via a check valve.

In this case, a backward flow of the solution from an absorber 75 to a separator 80 can be prevented owing to the check valve. However, while the operation of the refrigerating machine is interrupted for a long period of time, the solution leaks from the check valve and flows backward in small quantities in some cases. Therefore, this embodiment is slightly inferior to the above embodiments concerning the reliability.

In still another embodiment, an electromagnetic valve (not shown) may be provided between the pipes 96, 101 instead of the check valve.

When a predetermined period of time has elapsed after the starting of the refrigerating machine, the electromagnetic valve is opened, and it is closed after the machine has been stopped, whereby a backward flow of the solution from an absorber 75 to a separator 80 can be prevented.

Since the means for preventing a backward flow of the solution is provided as mentioned above, the lower headers 85, 89 of the condenser 73 and absorber 75 can be provided in the same level. Accordingly, the air cooled heat exchanger can be integrally formed, and the reduction of the cost price and dimensions of the refrigerating machine can be expected.

What is claimed is:

1. A double effect air cooled absorption refrigerating machine having at least an evaporator, an air cooled absorber, an ar cooled condenser, a high-temperature regenerator, a low-temperature regenerator, a solution heat exchanger, pipes operatively connecting said parts together, and fans for supplying the cooling air to said air cooled absorber and said air cooled condenser, characterized in that said fans are provided on one side frame member out of the upper, lower, and four side frame members which constitute a frame of a machine body, an air cooled heat exchanger being provided on the remaining three side frame members, the main parts other than said air cooled heat exchanger, such as said evaporator, said high-temperature regenerator, said low-temperature regenerator, said solution heat exchanger and said pipes operatively connecting said parts together being provided so as to be surrounded by said side frame members, a cover being provided at the upper portion of said machine body.

2. A double effect air cooled absorption refrigerating machine having an evaporator, an air cooled absorber, an air cooled condenser, a low-temperature regenerator, a high-temperature regenerator, a solution heat exchanger, a solution pump, a refrigerant pump, pipes operatively connecting said parts, and fans for supplying the cooling air to said air cooled absorber and said air cooled condenser, characterized in that said fans are provided on one side frame member out of the upper, lower, and four side frame members which constitute a frame of a machine body, an air cooled heat exchanger being provided on the remaining three frame members, the main parts other than said air cooled heat exchanger, such as said evaporator, said high-temperature regenerator, said low-temperature regenerator, said solution heat exchanger and said pipes operatively connecting said parts together being provided so as to be surrounded by said side frame members, a cover being provided at the upper portion of said machine body, said air cooled absorber and said air cooled condenser consisting of vertical tubes provided with fins on the outer surfaces thereof, said air cooled absorber having a plurality of path sections formed of said plurality of vertical tubes arranged in parallel with each other and the direction of a flow of the cooling air, with pump means provided, which are adapted to supply the thinnest absorption solution downward to the path section in which the temperature of the cooling air is the lowest, and gradually thicker solutions to the remaining parallel-arranged path sections in order, said air cooled condenser being provided on the side of the air cooled absorber in the path section in which the temperature of the air is the lowest, a flow passage being provided above said vertical tubes to supply refrigerant vapor to said air cooled absorber and said air cooled condenser, lower headers in said air cooled absorber for collecting a weak solution in each of said plural path section and lower headers in said air cooled condenser for collecting a liquefied refrigerant in each path section being provided in a row at the lower portions of said vertical tubes, a bleeder pipe being connected to at least a portion of said lower headers, an overflow pipe for a liquid refrigerant, which connects said evaporator and said lower headers in said air cooled absorber via a liquid seal means, being further provided.

3. A double effect air cooled absorption refrigerating machine according to claim 2, wherein a weak solution tank is provided under said lower headers, said weak solution tank and the lower header of a path section, in which the thinnest solution flows down, of said air cooled absorber being connected by a gas-liquid flow down pipe, a suction port of said solution pump being provided in opposition to an opening, which is in said weak solution tank, of said gas-liquid flow down pipe.

4. A double effect air cooled absorption refrigerating machine according to claim 2, wherein a liquid refrigerant heat exchanger is provided, which is adapted to subject to heat exchange a sprayed solution flow passage in the final path section, in which the thinnest solution flows down, in said air cooled absorber and a liquid refrigerant overflow pipe.

5. A double effect air cooled absorption refrigerating machine according to any one of claims 1-3, wherein said liquid refrigerant overflow pipe is passed through said weak solution tank 6. A double effect air cooled absorption refrigerating machine according to claim 5, wherein a flow passage through which the refrigerant vapor can be moved to the adjacent path sections is formed between said plurality of lower headers in said air cooled absorber consisting of a plurality of path sections, and a lower tube plate for said plural vertical tubes.

7. A double effect air cooled absorption refrigerating machine having an evaporator, an air cooled absorber, an air cooled condenser, a low-temperature regenerator, a high-temperature regenerator, a solution heat exchanger, a solution pump, a refrigerant pump, pipes operatively connecting said parts, and fans for supplying the cooling air to said air cooled absorber and said air cooled condenser, characterized in that said air cooled absorber and said air cooled condenser consists of vertical tubes provided with fins on the outer surfaces thereof, said air cooled absorber having a plurality of path sections formed of said plurality of vertical tubes arranged in parallel with each other and the direction of a flow of the cooling air, with pump means provided, which are adapted to supply the thinnest absorption solution downward to the path section in which the temperature of the cooling air is the lowest, and gradually thicker solutions to the remaining parallel-arranged path sections in order, said air cooled condenser being provided on the side of the air cooled absorber in the path section in which the temperature of the air is the lowest, a flow passage being provided above said vertical tubes to supply refrigerant vapor to said air cooled absorber and said air cooled condenser, lower heads in said air cooled absorber for collecting a weak solution in each of said plural path sections and lower headers in said air cooled condenser for collecting a liquefied refrigerant in each path section being provided in a row at the lower portions of said vertical tubes, a bleeder pipe being connected to at least a portion of said lower headers, an overflow pipe for a liquid refrigerant, which connects said evaporator and said lower headers in said air cooled absorber via a liquid seal means, being further provided.

8. A double effect air cooled absorption refrigerating machine according to claim 1, wherein a weak solution tank is provided under said lower headers, said weak solution tank and the lower header of a path section, in which the thinnest solution flows down, of said air cooled absorber being connected by a gas-liquid flow down pipe, a suction port of said solution pump being provided in opposition to an opening, which is in said weak solution tank, of said gas-liquid flow down pipe.

9. A double effect air cooled absorption refrigerating machine according to claim 1, wherein a liquid refrigerant heat exchanger is provided, which is adapted to subject to heat exchange a sprayed solution flow passage in the final path section, in which the thinnest solution flows down, in said air cooled absorber and a liquid refrigerant overflow pipe.

10. A double effect air cooled absorption refrigerating machine having regenerators, a condenser, an evaporator, an absorber, a solution heat exchanger, a solution pump, a refrigerant pump, pipes operatively connecting said parts together, and a separator which is provided at the intermediate portion of the pipe connecting said condenser and said evaporator together, and which is adapted to separate a surface active agent, characterized in that fans are provided on one side frame member out of upper, lower, and four side frame members which constitute a frame of a machine body, an air cooled heat exchanger being provided on the remaining three side frame members, the main parts other than said air cooled heat exchanger, such as said evaporator, said high-temperature regenerator, said low-temperature regenerator, said solution heat exchanger and said pipes operatively connecting said parts together being provided so as to be surrounded by said side frame members, a cover being provided at the upper portion of said machine body, a layer of said surface active agent separated into said separator and said absorber being connected via said backward flow preventing means.

11. A double effect air cooled absorption refrigerating machine according to claim 10, wherein said backward flow preventing means is provided so that the pipe connecting said separator and said absorber together has a rising portion higher than the surface of the solution in at least said absorber.

12. A double effect air cooled absorption refrigerating machine according to claim 11, wherein said rising portion of said pipe is communicated at its upper end with a gaseous portion of said absorber.

13. A double effect air cooled absorption refrigerating machine according to claim 11, wherein said rising portion of said pipe is formed in the shape of the letter "U".

* * * * *